April 24, 1956 W. F. TIMM 2,742,992
CLUTCH PLATES
Filed July 18, 1952
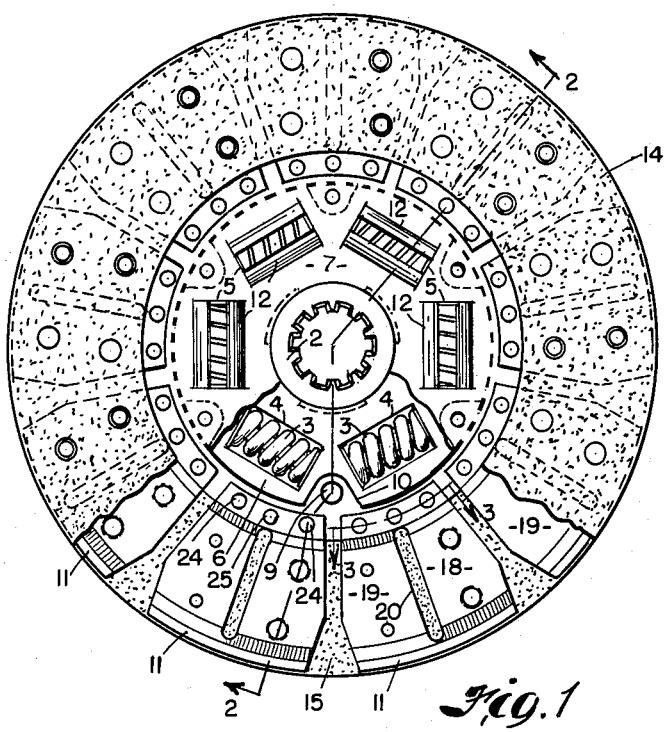
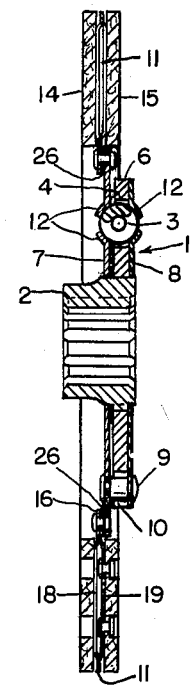
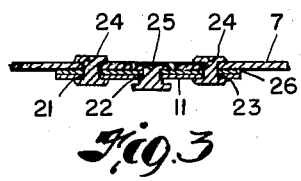
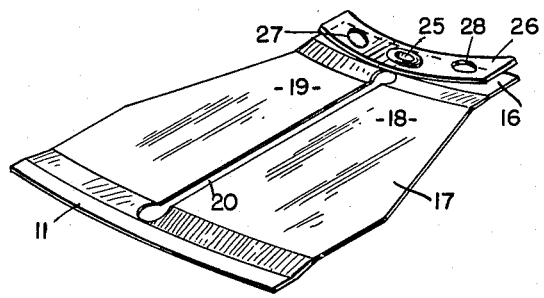
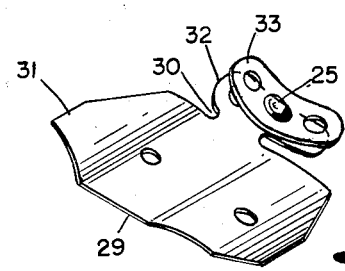
INVENTOR.
WERNER F. TIMM
BY
Oberlin Limbach
ATTORNEYS.

United States Patent Office 2,742,992
Patented Apr. 24, 1956

2,742,992
CLUTCH PLATES

Werner F. Timm, Cleveland, Ohio, assignor, by mesne assignments, to Maremont Automotive Products, Inc., Chicago, Ill., a corporation of Illinois Application July 18, 1952, Serial No. 299,543

11 Claims. (Cl. 192—107)

The present invention relates generally as indicated to clutch plates and more particularly to clutch plates of the type wherein cushion members extending radially of the disc body of the clutch plate serve to mount friction facings for resilient axial movement or compression under clutch packing pressure, said members transmitting torque to the disc body through the rivets which attach said members to said body.

Present-day automotive clutches operate at relatively high speeds and it has been the aim of clutch plate manufacturers to reduce the spinning inertia of clutch plates to a minimum and to this end the cushion members have been made of relatively thin spring steel stock, thinner than the disc body to which said members are riveted. However, this affords only a partial solution to the problem since the thinness of the cushion members has been limited, not by the strength thereof for torque transmission, but rather by the stresses imposed on the attaching rivets. It has been found that in conventional automotive clutch plates the bearing stress on the cushion member attaching rivets as imposed by the torque transmitted by the cushion members to the disc body will be excessive, that is, the edges of the rivet holes in the cushion members tend to cut into the rivets if the cushion members are of thickness less than about .030 inch.

It is one object of this invention to provide a clutch plate having cushion members which are appreciably thinner than the above indicated minimum at the outer friction facing mounting portions thereof so as to reduce the polar moment of inertia or the spinning inertia more than has been possible heretofore, and which cushion members are of requisite thickness at the inner attaching portions to thereby maintain a safe bearing stress on the attaching rivets.

It is another object of this invention to provide a composite cushion member and shim unit which provides such thin outer portion and thicker inner portion for achieving the desired ends aforesaid.

It is another object of this invention to provide a cushion member which has an inner attaching portion of resilient construction which serves to take up any looseness which might develop in the attaching rivets and thereby maintain quiet rattle-free operation of the clutch plate.

Other objects and advantages will become apparent as the following description proceeds. To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

Fig. 1 is a plan view of a clutch plate embodying the present improvements;

Fig. 2 is a cross section view taken substantially along the line 2—2, Fig. 1;

Fig. 3 is a cross section view taken substantially along the line 3—3, Fig. 1;

Fig. 4 is a perspective view of one form of cushion member-shim unit, and

Fig. 5 is a perspective view of a modified form of cushion member-shim unit.

Referring now to the drawing and first more particularly to Figs. 1 and 2 thereof, the clutch plate shown therein is of the "cushion-center" type comprising a disc body 1 supported for limited resilient rotation about a central hub 2, there being coil springs 3 or the like disposed in registering openings 4 and 5 formed in the flange 6 of said hub and in the opposed cover plates 7 and 8 of said disc body. Thus, torque is smoothly transmitted from the disc body 1 to said hub 2 or vice versa through said springs 3, the opposite ends of which springs engage the opposite ends of said openings 4 and 5.

Said cover plates 7 and 8 are secured together in spaced apart relation straddling the flange 6 as by means of shouldered rivets 9 which pass through notches 10 formed around the periphery of said flange 6, the sides of said notches 10 being adapted to engage said rivets 9 to limit the degree of relative rotation of said hub 2 and disc body 1 in opposite directions.

Said cover plate 7 is as shown preferably of larger diameter than the other cover plate 8 so as to provide a peripheral portion for attachment of radially-extending cushion members 11 therearound. The clutch plate thus far described is more or less of a conventional form and may be variously modified and need not be of the cushion-center type, but rather said disc body 1 may simply comprise a plain disc secured to the central hub 2.

The cover plates 7 and 8 will generally be fabricated from relatively low carbon steel of relatively heavy gauge, for example .050 inch stock so that the openings 5 may readily be formed therein and the spring retainer lips 12 struck therefrom.

The cushion members 11 may be of various well-known forms so as to provide two series of axially opposite faces to which opposed friction facings 14 and 15 may be secured for resilient axial compression or movement under clutch packing pressure. The cushion members 11 as illustrated in Figs. 1 to 4 each comprise a relatively thin piece of spring steel stock, thinner than has been practicable heretofore, of generally segmental shape having an inner attaching portion 16 and an outer radially slotted portion 17. As shown, the areas 18 and 19 on opposite sides of the slot 20 of each cushion member are axially offset with respect to each other whereby the friction facings 14 and 15 which are adapted to be secured to the respective areas 18 and 19 are resiliently maintained in spaced-apart relation. Thus, under clutch packing pressure said facings 14 and 15 are resiliently moved toward each other until the areas 18 and 19 of the cushion members 11 are coplanar.

The inner attaching portion 16 of each cushion member 11 is provided with three circumferentially spaced holes 21, 22 and 23 therethrough, the end holes 21 and 23 being intended for the attaching rivets 24 which serve to attach the cushion members to the disc body 1 and the center hole 22 being intended for the rivet 25 which attaches a shim 26 to each cushion member 11 for the purpose of increasing the effective thickness of each cushion member 11 to a value such that the bearing stress on the mounting rivets 24 as imposed by torque transmitted by the cushion members to the disc body is within safe limits. Said shim 26 is provided with holes 27 and 28 for rivets 24. In this way the cushion members 11 may be considerably thinner than has been possible before and, therefore, the spinning inertia especially of the outer portion of the clutch plate is correspondingly reduced.

Although a separate shim 26 is herein shown as attached to each cushion member 11, it will be apparent that said shims 26 may comprise a single annular ring attached to the cushion members 11 by rivets 25 or equivalent attaching means. Where such annular shim is employed, the assembly of such ring and the cushion members 11 attached therearound may be secured as a unit to the cover plate 7 of the disc body 1. Also, although the shims 26 are riveted to the cushion members 11 other means of rotatively interlocking these parts together may be employed such as for example welding, or interfitting lugs and recesses on said shims and cushion members or equivalent keying means.

As best shown in Fig. 4 each shim 26 is of transversely bowed or waved form and is of spring material so that when the cushion member-shim units are attached to said cover plate 7, the flattening of said shims forms a resilient connection which takes up any subsequent looseness which might develop in the mounting rivets 24.

In one form of the present clutch plate and as aforesaid the cover plates 7 and 8 or equivalent members are made of relatively heavy gauge material, that is about .050 inch stock. On the other hand the cushion members 11 are preferably made of relatively thin spring steel stock of, for example, .020 inch thickness to provide the requisite minimum polar moment of inertia of the outer portion of the clutch plate assembly while having adequate strength for transmission of high torque. The shims 26 are also made of spring stock, but in view of the fact that ordinarily a thickness of .030 inch is sufficient to maintain the bearing stress on the rivets 24 within a safe limit, said shims need be only .010 inch in thickness. Since the shims 26 are attached to the cushion members there is provided an effective thickness of .030 inch at the inner attaching portion of the composite cushion member-shim unit. As is evident, the mere provision of a shim between the cushion members and the cover plate 7 would not enable the use of such minimum thickness cushion member since in such event the bearing stress on the mounting rivets 24 resulting from the use of a cushion member 11 of thickness such as indicated would be excessive and the cushion members would soon cut through the mounting rivets 24. However, by attaching or otherwise rotatively interlocking the shim 26 to the cushion member 11, the combined thickness of the shim and of the cushion member provides a sufficiently large bearing area to avoid such cutting of the attaching or mounting rivets 24.

The modification illustrated in Fig. 5 is substantially the same as that just described except that the cushion member 29 is provided with a relatively narrow neck portion 30 and a circumferentially extending wave-like outer portion 31 which together with the other cushion members provides a substantially continuous annular ring of circumferentially-waved form to the crests of which waves the opposite friction facings 14 and 15 are attached. Here again, as in Fig. 4, the inner attaching portion 32 is formed with three holes therethrough to the center hole of which is attached, by means of rivet 25, the transversely-bowed shim 33. With the type of cushion member 29 illustrated in Fig. 5 it is especially important to provide adequate bearing areas between the mounting rivets and the cushion members in view of the non-symmetrical disposition of the mounting or attaching portion 32 relative to the outer waved portion 31.

Other modes of applying the principle of the invention may be employed, change being made as regards the details described, provided the features stated in any of the following claims or the equivalent of such be employed.

I, therefore, particularly point out and distinctly claim as my invention:

1. A cushion member arranged to be secured to a disc body of a clutch plate by a fastening element and to extend radially from such body comprising a relatively thin first edge portion for receiving friction facings and a second edge portion for attachment to such disc body by the fastening element, and means made rigid with said second edge portion independent of the fastening element and defining a torque-transmitting bearing surface appreciably thicker than said relatively thin first edge portion for engaging the fastening element.

2. A cushion member as defined in claim 1 wherein said means comprises a shim rigidly secured in overlapping relation to said second edge portion.

3. A cushion member as defined in claim 2 wherein said shim is made of spring metal and is transversely deformed to provide a resilient connection between said second portion and the disc body operable to take up any looseness which may develop in the fastening element connection.

4. A clutch plate comprising a disc body, a circumferential series of relatively thin radially extending cushion members each having an inner circumferentially extending portion which radially overlaps a peripheral portion of said body and an adjoining outer friction facing mounting portion extending radially outward therefrom and beyond the periphery of said body, fastening elements securing said inner portions to said body, and means made rigid with the inner portion of each member independent of said fastening elements and defining a torque-transmitting bearing surface appreciably thicker than the outer portion of each member for engaging said fastening elements.

5. A clutch plate as defined in claim 4 wherein said means comprises a shim rigidly secured to the inner portion of each cushion member in overlapping relation thereto.

6. A clutch plate as defined in claim 5 wherein each shim is made of spring metal and is transversely deformed to provide a resilient connection between the associated inner portion and said body operable to take up any looseness which may develop in the fastening element connection.

7. A clutch plate comprising a disc body, a circumferential series of radially extending cushion members each having an inner circumferentially extending portion which radially overlaps a peripheral portion of said body and is riveted thereto and an adjoining outer friction facing mounting portion extending radially outward from said inner portion and beyond the periphery of said body, and a shim fixedly secured to the inner portion of each cushion member independently of the riveted attachment thereof to said body whereby such inner portions of said members are effectively thickened to correspondingly reduce bearing stresses on the attaching rivets as imposed by torque transmitted by said cushion members to said body.

8. The clutch plate of claim 7 wherein each cushion member has a separate shim attached thereto.

9. A clutch plate comprising a disc body, a series of radially extending cushion members adapted to mount on their outer portions friction facings, the inner portion of each cushion member having at least three circumferentially spaced holes therethrough, a shim provided with holes registering with the holes in said cushion member, a rivet through one hole of said shim and cushion member securely attaching them together, and rivets through the remaining holes of said shim and cushion member and through corresponding holes in the peripheral portion of said body for attaching said cushion member and shim as a unit to said body, the inner portion of each cushion member being thereby effectively thickened for reduced bearing stress on the last mentioned rivets as imposed by torque transmitted by said cushion members to said body.

10. The clutch plate of claim 9 wherein said rivet for attaching said cushion member and shim together extends through the middle one of the three holes through said cushion member.

11. Means for reducing the bearing stresses in a riveted connection between a relatively thin cushion member and a relatively thicker disc body of a clutch plate, comprising a shim attached to said cushion member whereby said cushion member and shim when riveted as a unit to said disc body presents a rivet hole torque transmitting bearing surface equivalent to the sum of the thicknesses of said cushion member and shim, said shim being of spring metal and transversely deformed to provide a resilient connection between said cushion member-shim unit and said body which takes up any looseness which may develop in the riveted connection.

References Cited in the file of this patent

UNITED STATES PATENTS

| | | |
|---|---|---|
| 1,609,448 | Wemp | Dec. 7, 1926 |
| 2,246,156 | Wemp | June 17, 1941 |
| 2,277,603 | Nutt et al. | Mar. 24, 1942 |
| 2,281,898 | Whitten | May 5, 1942 |
| 2,321,821 | Katcher | June 15, 1943 |
| 2,391,495 | Wemp | Dec. 25, 1945 |
| 2,408,441 | Nutt | Oct. 1, 1946 |
| 2,658,598 | Thelander | Nov. 10, 1953 |

FOREIGN PATENTS

| | | |
|---|---|---|
| 858,110 | France | Nov. 18, 1940 |